United States Patent
Gadd

(10) Patent No.: US 11,927,496 B2
(45) Date of Patent: Mar. 12, 2024

(54) OPTICAL SENSING SYSTEM

(71) Applicant: Airbus Operations Limited, Bristol (GB)

(72) Inventor: Matthew Gadd, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 17/846,812

(22) Filed: Jun. 22, 2022

(65) Prior Publication Data

US 2022/0412827 A1 Dec. 29, 2022

(30) Foreign Application Priority Data

Jun. 23, 2021 (GB) .................................... 2109013

(51) Int. Cl.
- *G01L 1/24* (2006.01)
- *G01D 5/353* (2006.01)
- *G01M 11/00* (2006.01)
- *G02B 6/12* (2006.01)

(52) U.S. Cl.
CPC .......... *G01L 1/246* (2013.01); *G01D 5/35341* (2013.01); *G01D 5/35354* (2013.01); *G01M 11/39* (2013.01); *G02B 6/12009* (2013.01); *G02B 2006/12085* (2013.01); *G02B 2006/12138* (2013.01)

(58) Field of Classification Search
CPC ....... G01L 1/242–247; G01D 5/35338–35367; G01M 11/31; G01M 11/33; G01M 11/39
See application file for complete search history.

(56) References Cited

U.S. PATENT DOCUMENTS

| 5,144,690 A | 9/1992 | Domash |
| 5,723,857 A | 3/1998 | Underwood et al. |
| 7,011,453 B1 * | 3/2006 | Harres ............... G01M 11/3109 356/73.1 |
| 2003/0052256 A1 | 3/2003 | Spirin et al. |

(Continued)

FOREIGN PATENT DOCUMENTS

| DE | 102004007801 A1 * | 9/2005 |
| EP | 2 643 663 | 10/2013 |

(Continued)

OTHER PUBLICATIONS

Extended European Search Report for application 22180854.6, dated Nov. 21, 2022. (Year: 2022).*

(Continued)

*Primary Examiner* — Michael Stahl
(74) *Attorney, Agent, or Firm* — Nixon & Vanderhye P.C.

(57) ABSTRACT

An optical sensing system comprising an optical fiber, a light source, a first interrogator and a second interrogator. The optical fiber includes one or more optical sensors. The light source is placed at a first end of the optical fiber and is configured to direct light towards the one or more optical sensors. The first interrogator is placed at the first end of the optical fiber. The second interrogator placed at a second, opposite end of the optical fiber. The first interrogator is configured to receive reflected light from the one or more optical sensors, and the second interrogator is configured to receive transmitted light from the one or more optical sensors.

16 Claims, 3 Drawing Sheets

(56) References Cited

U.S. PATENT DOCUMENTS

| | | |
|---|---|---|
| 2004/0222364 A1* | 11/2004 | Kenny ................. G01M 11/083 250/227.14 |
| 2004/0240769 A1 | 12/2004 | Spirin et al. |
| 2004/0240833 A1* | 12/2004 | Stegall ................. G01M 11/336 385/147 |
| 2008/0085080 A1* | 4/2008 | Dimmick ........... G01K 11/3206 374/E11.016 |
| 2011/0110621 A1 | 5/2011 | Duncan et al. |
| 2012/0198849 A1 | 8/2012 | Johnston |
| 2013/0278918 A1* | 10/2013 | Glavind ................. H02K 11/25 374/142 |
| 2016/0084640 A1 | 3/2016 | Hunt et al. |
| 2019/0025095 A1* | 1/2019 | Steel ................. G01D 5/35358 |
| 2019/0277708 A1* | 9/2019 | Miller ................. G01D 5/35316 |

FOREIGN PATENT DOCUMENTS

| | | |
|---|---|---|
| EP | 2643663 B1 * | 3/2015 |
| WO | 2008/042959 | 4/2008 |
| WO | 2012/069058 | 5/2012 |
| WO | 2013/109987 | 7/2013 |

OTHER PUBLICATIONS

Combined Search and Examination Report for application GB2109013. 9, dated Dec. 23, 2021. (Year: 2021).*

Xu et al., "Discrimination between strains and temperature effects using dual-wavelength fibre grating sensors" Electronic Letters., Jun. 23, 1994., vol. 30, No. 13, pp. 1085-1087 (3 pages).

* cited by examiner

OPTICAL SENSING SYSTEM

RELATED APPLICATION

This application incorporates by reference and claims priority to United Kingdom patent application GB 2109013.9, filed Jun. 23, 2021.

TECHNICAL FIELD

The present invention relates to an optical sensing system for sensing strain or temperature, and to vehicles, such as aircraft, comprising the same.

BACKGROUND

An aircraft may comprise fiber Bragg sensors for sensing strain in order to determine load and torque of safety critical applications.

SUMMARY

A first aspect of the present invention provides an optical sensing system comprising: an optical fiber comprising one or more optical sensors; a light source placed at a first end of the optical fiber, wherein the light source is configured to direct light towards the one or more optical sensors; a first interrogator placed at the first end of the optical fiber; and a second interrogator placed at a second, opposite end of the optical fiber, wherein the first interrogator is configured to receive reflected light from the one or more optical sensors, and the second interrogator is configured to receive transmitted light from the one or more optical sensors.

Optionally, the one or more optical sensors are configured to sense changes in strain or temperature along the optical fiber.

Optionally, the first and second interrogators are configured to analyse the light received from the one or more optical sensors to determine changes in strain or temperature along the optical fiber.

Optionally, the optical sensing system comprises a comparing unit configured to compare the strains or temperatures determined by the first and second interrogators.

Optionally, the optical sensing system comprises a further light source placed at the second end of the optical fiber and configured to direct light towards the one or more optical sensors in the event of a failure of the light source.

Optionally, the one or more optical sensors are fiber Bragg grating sensors.

Optionally, the optical fiber comprises at least two optical sensors configured to operate at two different frequency ranges.

Optionally, the first and second interrogators are identical interrogators, each being configured to operate in a different operational mode.

Optionally, the optical fiber is embedded or attached to a safety critical system of an aircraft.

A second aspect of the present invention provides a method for sensing a strain or temperature, the method comprising: directing light towards one or more optical sensors, the one or more optical sensors being comprised in an optical fiber; receiving transmitted light from the one or more optical sensors at a first interrogator, the first interrogator being placed at one end of the optical fiber; and receiving reflected light from the one or more optical sensors at a second interrogator, the second interrogator being placed at the another end of the optical fiber.

Optionally, the one or more optical sensors are configured to sense changes in strain or temperature along the optical fiber.

Optionally, the method comprises analysing the light received from the one or more optical sensors by each of the first and second interrogators and determining changes in strain or temperature along the optical fiber.

Optionally, the method comprises comparing the strains or temperatures determined by each of the first and second interrogators.

Optionally, the method comprises providing a light source at one end of the optical fiber and a further light source at an opposite end of the optical fiber, directing light towards one or more optical sensors using the light source, and directing light towards one or more optical sensors using the further light source in the event of a failure of the light source.

Optionally, the method comprises providing a light source at one end of the optical fiber and a further light source at an opposite end of the optical fiber, directing light towards one or more optical sensors using the light source, and directing light towards one or more optical sensors using the light source or the further light source.

Optionally, the one or more optical sensors are fiber Bragg grating sensor.

Optionally, the optical fiber comprises at least two optical sensors configured to operate at two different frequency ranges.

Optionally, the first and second interrogators are identical interrogators, each being configured to operate in a different operational mode.

Optionally, the optical fiber is embedded or attached to a safety critical system of an aircraft.

A third aspect of the present invention provides an aircraft comprising the system of the first aspect.

Optionally, the system senses changes in strain or temperature of a component of the aircraft.

BRIEF DESCRIPTION OF THE DRAWINGS

Embodiments of the invention will now be described, by way of example only, with reference to the accompanying drawings, in which.

DETAILED DESCRIPTION

Figure 1:
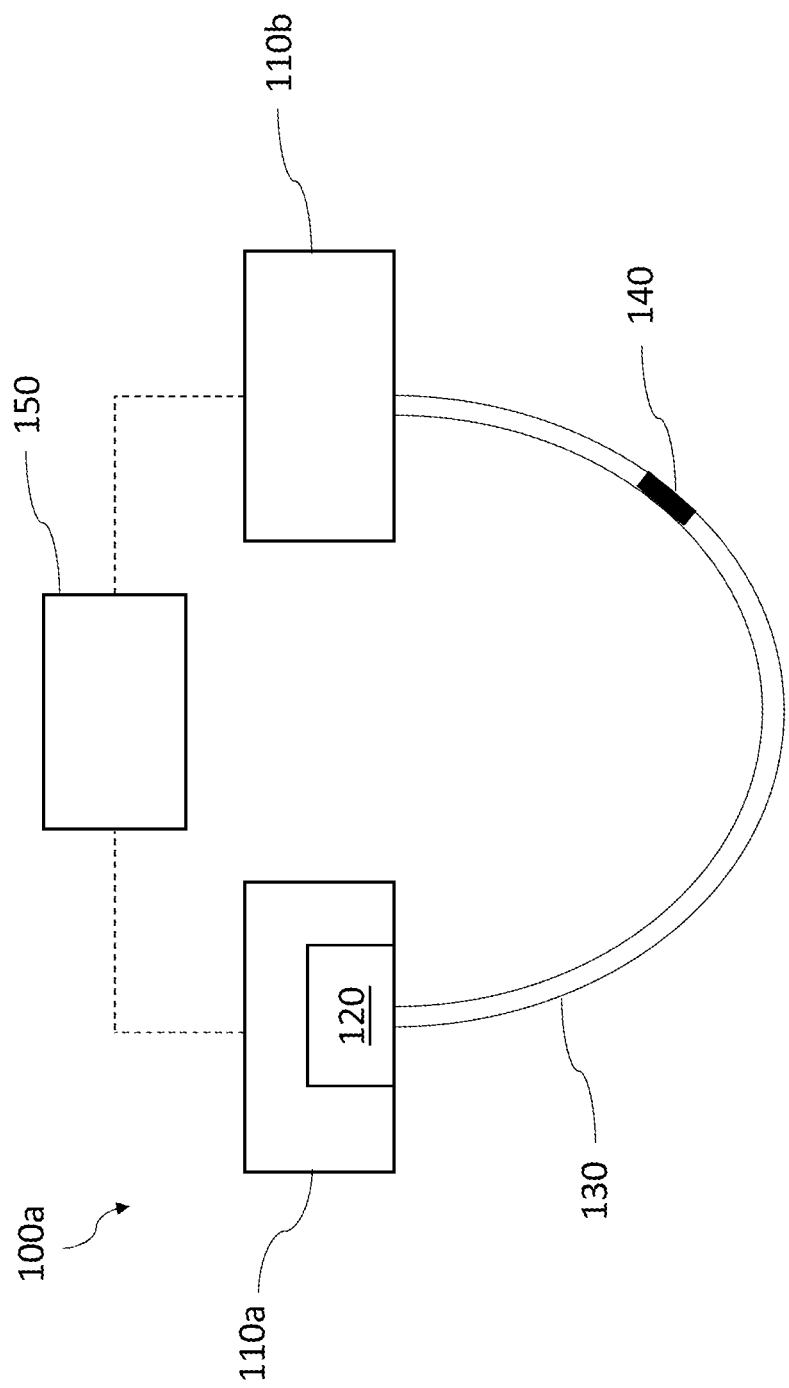
FIG. 1 shows a schematic view of an optical sensing system according to an example.

Referring to FIG. 1, there is shown a schematic view of an optical sensing system 100, according to an example. The optical sensing system 100 comprises an optical fiber 130, a light source 120, a first interrogator 110*a* and a second interrogator 110*b*.

The optical fiber 130 comprises an optical sensor 140. In this example, the optical sensor is a fiber Bragg grating (FBG) sensor comprising periodic variations in the refractive index of the core of the optical fiber 130 along a section of the length of the optical fiber 130. In other examples, the optical sensor 140 may be a distributed sensor (for example, operating according to the principles of Rayleigh, Brillouin or Raman scattering), a long-period grating sensor, or a tilted grating sensor.

The wavelength of a band of light reflected from the optical sensor 140 is dependent on the strain of the optical fiber 130 within which the optical sensor is located and/or the temperature to which the optical sensor is subjected. FBG sensors are advantageous as they are lightweight and the spacing between FBG elements may be below 1 mm. The FBG sensor is etched directly into the core of the optical fiber 130. Depending on the application, the optical fiber 130 may comprise multiple optical sensors. For example, the optical fiber 130 may comprise two optical sensors 140. Each of the two optical sensors may be configured to operate at a different frequency range. Alternatively, the optical fiber 130 may comprise multiple optical sensors forming a continuous grating. As a result, a large number of sensing points can be located in a small area. The optical fiber 130 may comprise a large number of optical sensors, for example, over 1000 FBG sensors. Alternatively, the optical fiber 130 may comprise a small number of optical sensors, for example, 10 FBG sensors.

The optical fiber 130 may be embedded or attached to a structure, such as a safety critical system of an aircraft. The optical sensor 140 is sensitive to changes in strain and/or temperature of the structure. The strain and/or temperature of the structure are determined by analysing optical characteristics of the optical sensor 140.

When a mechanical force is applied to the optical fiber 130, the optical characteristics of the optical sensor 140 change. In particular, if the optical sensor 140 is an FBG sensor, when the mechanical force is applied, the spacing of the grating of the FBG sensor changes. Therefore, the emission wavelength of the FBG sensor changes. For example, if a compression is applied to the FBG sensor, the spacing of the grating is reduced, engendering a blue shift in wavelength. In contrast, if a tension is applied to the FBG sensor, the spacing of the grating is increased, engendering a red shift in wavelength. When the temperature of the optical fiber 130 changes, the optical characteristics of the optical sensor 140 may also change. In particular, changes in temperature may cause the refractive indices of the optical sensor to change. In some cases, changes in the temperature of the optical fiber 130 may additionally or alternatively cause the optical sensor to thermally expand or contract.

The light source 120 is placed at a first end of the optical fiber 130, and is configured to direct light towards the optical sensor 140. For example, the first interrogator 110a may comprise the light source 120. The light source 120 may be a tuneable laser. In another example, the light source 120 may be a broadband light source or a broadband light source with tuneable a narrowband filter.

The first interrogator 110a is placed at the first end of the optical fiber 130, and the second interrogator 110b is placed at a second, opposite end of the optical fiber 130. The first interrogator 110a is configured to receive reflected light from the optical sensor 140, and the second interrogator 110b is configured to receive transmitted light from the optical sensor 140. Each interrogator 110a, 110b is configured to determine strain and/or temperature at the optical sensor 140 based on the received light. In particular, the first interrogator 110a is configured to determine strain and/or temperature at the optical sensor 140 based on the received reflected light, and the second interrogator 110b is configured to determine strain and/or temperature at the optical sensor 140 based on the received transmitted light. The optical characteristics of the optical sensor 140 may be represented as optical spectra. For example, if the optical sensor 140 is an FBG sensor, the optical characteristics may represent a pattern or spacing of the grating of the FBG sensor. In use, the optical sensor receives light from the light source 120 emitting a full wavelength optical spectrum. The light passes through the optical fiber 130 and reaches the optical sensor 140. A characteristic of the light is modified by the optical sensor and an optical spectrum is obtained. The characteristic of the light may be, for example, a spectrum of wavelengths. The strain and/or temperature determined by the interrogators 110a, 110b may be used to determine the behaviour or properties of the structure to which the optical fiber 130 is attached. For example, the strain may be used to determine load or torque of safety critical applications of the structure.

Broadly speaking, each interrogator 110a, 110b comprises at least one light measurer, and is configured to determine a strain and/or temperature of the structure, to which the optical fiber 130 is attached, based on the optical light received at the light measurer from the optical sensor 140. The light measurer may be, for example, a wavelength meter, a photodetector, or a photodiode, such as an avalanche photodiode or a PIN diode.

The interrogator 110a may comprise a primary optical splitter, a plurality of secondary optical splitters, the light source 120, a processor, a plurality of light measurers, and an analogue to digital converter. The processor is communicatively connected to the light measurers.

The light source 120 may be arranged to output light into the primary optical splitter. The primary optical splitter splits the light received from the light source 120 into two portions, and these two portions are fed into the first and second secondary optical splitters, respectively. From the first secondary optical splitter, the portion of light received from the primary optical splitter is sent through optical sensor 140. The reflected light from optical sensor 140 passes back through the first secondary optical splitter to the first light measurer, and the reflected light from the optical sensor 140 passes back through the second secondary optical splitter to the second light measurer.

In embodiments in which the light source is a broadband light source, the, or each of the, light measurer(s) may be a wavelength meter configured to measure the wavelength of the light reflected from the optical sensor 140. The processor processes the wavelength(s) measured by light measurers, and converts the measured wavelengths (for example via a calibration) into a mechanical force or thermal energy applied to the sensors.

In embodiments in which the light source 120 is a tuneable narrow band optical source, such as a tuneable laser as in the present embodiment, the, or each of the, light measurer(s) may be a photodetector or a photodiode such as an avalanche photodiode or a PIN diode configured to measure the intensity of light reflected from the optical sensor 140. The analogue to digital converter is arranged to convert the analogue photodiode signals into digital signals, which are then provided to the processor. In this example, the processor is arranged to control the tuneable laser to emit light successively at different wavelengths, and at the same time monitor light intensity signals received from the photodiodes. The processor can thus determine for which emitted wavelength the highest intensity of reflected light is detected, and thereby determine the wavelength of light most reflected by the optical sensor at that point in time. The processor may then convert the determined wavelengths (for example via a calibration) into a mechanical force or thermal energy applied to the sensors.

It will be appreciated that although two secondary optical splitters and two associated light measurers are described in the examples above, in other examples there may be any number of optical splitters and associated light measurers. For example, depending on the number of optical sensors required, there may be one pair of secondary optical splitters and an associated light measurer for each optical sensor. In some examples, as noted above, there may be only one light measurer and associated secondary optical splitter for all optical sensors.

The first and second interrogators 110a, 110b may be identical interrogators, each being configured to operate in a different operational mode. In this example, the first interrogator 110a is configured to operate in a mode in which the reflected light is detected and analysed, and, in contrast, the second interrogator 110b is configured to operate in a mode in which the transmitted light is detected and analysed. The second interrogator 110b may comprise a further light source which is turned off. Alternatively, the light source of the first interrogator 110a and the further light source of the second interrogator 110b may be operate alternately. In this configuration, one of the interrogators continues to detect reflected light, and the other of the interrogators detects transmitted light. Each of the interrogators 110a, 100b then alternates between reflected light and transmitted light according to which of the light sources in turned on. The light source 120 and the further light source may be identical. Additionally or alternatively, the further light source may be used to replace the light source 140 in the event of a failure of the light source 120. That way, if the optical sensing system 100 is part of a safety critical application of an aircraft, it is possible to avoid common mode failure as, in case of a failure of one of the light sources, the other light source can be used as a backup light source.

Similarly, in the event of a failure of one of the first interrogator 110a or the second interrogator 110b, the other one of the first interrogator 110a or the second interrogator 110b can continue to measure strain and/or temperature of the optical fiber 130, therefore preventing common mode failure of safety critical applications. Additionally, as indicated above, having one of the two interrogators 110a, 110b analysing the reflected light and the other interrogator detecting the transmitted light prevents common mode failure. In fact, having the first and second interrogators 100a, 110b operating in two different modes provides a simple way to obtain two different measurements.

The optical sensing system 100 may comprise a comparing unit 150 configured to compare the strain or temperature results determined by the first and second interrogators 110a, 110b. The first and second interrogators 110a, 110b may be connected to a comparing unit 150, which may be, for example a computer, which receives the results of analysis of each of the first and second interrogators 110a, 110b. In the event of a difference between the results from the first and second interrogators 110a, 110b, the comparing unit may be restarted. Additionally or alternatively, the first and second interrogators 110a, 110b may be restarted. In the event that a difference continues to exist between the results following a restart, the system 100 may record or indicate a fault or failure. In another example, each of the first and second interrogators 110a, 110b may be connected to a further comparing unit, which again compares the results of analysis of each of the first and second interrogators 110a, 100b. The provision of a pair of comparing units provides a level of redundancy, should one of the comparing units fail.

Figure 2:
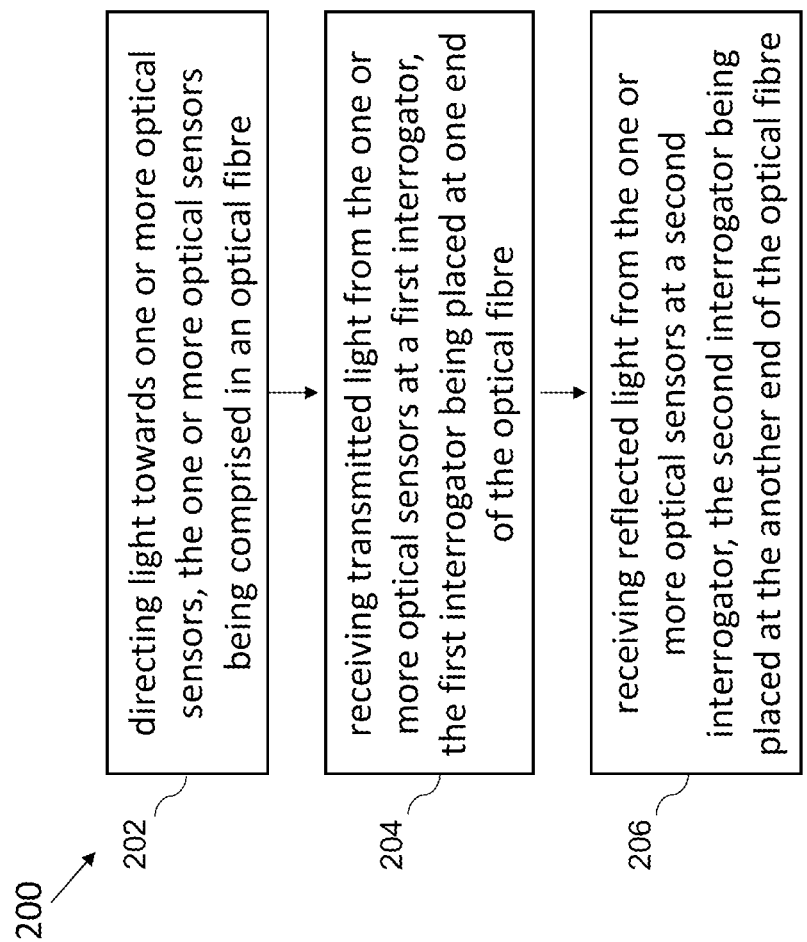
FIG. 2 is a flow diagram of a method for sensing strain or temperature according to an example.

Referring to FIG. 2, there is shown a flow diagram of a method 200 for sensing strain or temperature according to an example. The method may be implemented by the optical sensing system 100 described above.

The method 200 comprises, at a first block 202, directing light towards one or more optical sensors 140, the one or more optical sensors 140 being comprised in an optical fiber 130. Each of the optical sensors may be an FBG sensor. Additionally or alternatively, different optical sensors may have different optical characteristics. For example, different optical sensors may operate at a different frequency ranges (i.e. have different frequency responses). The optical fiber 130 may be embedded in or attached to a safety critical system, such as a landing gear, braking system, an engine control system, in order to sense the strain applied on the optical fiber 130 by the safety critical system or the temperature of the safety critical system.

Light may be directed from a light source 120 towards the optical sensors 140. Alternatively, if the method is implemented in a safety critical application, light may be directed from two light sources towards the optical sensors 140, each light source operating alternately for a predetermined time. For example, a light source may be placed at one end of the optical fiber 130 and a further light source at an opposite end of the optical fiber 130. In another example, the light may be directed towards the optical sensors 140 using the light source placed at the one end of the optical fiber 130, and directing light towards the one optical sensors using the further light source in the event of a failure of the light source. Therefore, one of the two light sources may be used as a backup light source.

The method 200 also comprises, at a second block 204, receiving transmitted light from the optical sensors 140 at a first interrogator 110a, the first interrogator 110a being placed at one end of the optical fiber 130 and, at a third block 206, receiving reflected light from the optical sensors 140 at a second interrogator 110b, the second interrogator 110b being placed at the another end of the optical fiber 130.

For example, the first and second interrogators 110a, 110b may be identical but each operating in a different mode. In particular, the first interrogator 110a may be operating in a mode which enables the analysis of received transmitted light, the second interrogator 110b may be operating in a mode which enables the analysis of received reflected light.

In an example, the first and second interrogators 110a, 110b receive transmitted and reflected light, respectively, received from the optical sensors 140. Each interrogator 110a, 110b analyses the received light from the optical sensors and determines strain and/or temperature applied to the optical fiber 130 based on the received light. For example, the first and second interrogators 110a, 110b may analyse a spectrum of wavelength representing the characteristics of the optical sensors 140.

The method 200 may comprise a further step of receiving, at a comparing unit, the strain or temperature results determined by each of the first and second interrogators 110a, 110b and comparing the two results. In the event of a discrepancy between the two results, the method 200 may comprise a further step of switching off or restarting one or both of the first and second interrogators 110a, 110b and/or the comparing unit.

Figure 3:
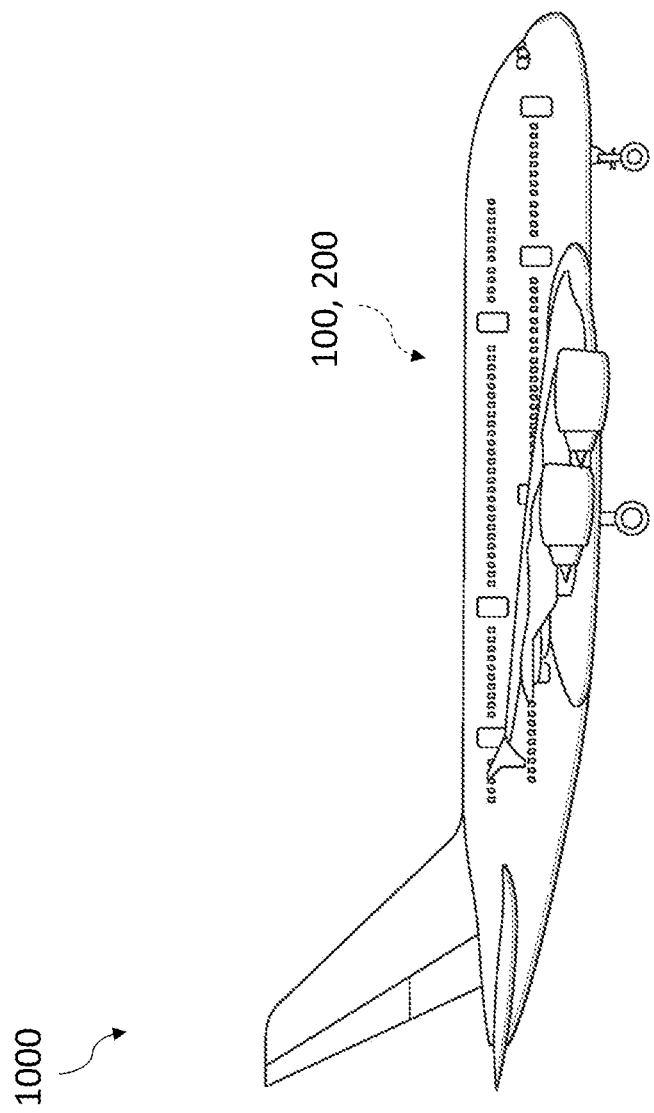
FIG. 3 is a view of an aircraft including an optical sensing system according to an example.

FIG. 3 is a view of an aircraft 1000 including an optical sensing system 100 according to an example. The aircraft 1000 may comprise any of the optical systems 100 described above.

The aircraft 1000 may comprise one or more optical sensing systems 100, each optical sensing system 100 having an optical fiber 130 attached to a safety critical application. For example, the optical fiber 130 may be attached to the braking system, landing gear control system, engine control system, or a fuel system of the aircraft 1000. Each of the optical sensing systems 100 may be used to sense strain or temperature of a safety critical system of the aircraft

1000. For example, one optical sensing system 100 may be used to sense the strain applied by the wing load alleviation system of the aircraft 1000.

The optical sensing system 100 described herein provides an arrangement in which a failure condition occurs only in the event of at least two failures in the system. In particular, the optical sensing system 100 described herein prevents common mode failure of safety critical systems. Additionally, other advantages include limiting the need for hardware development while ensuring safety. For example, as explained above, two identical interrogators may be used, each operating in a different mode. Similarly, two identical light sources may be used, one being used to replace the other in case of failure, or each light source being used alternately. One of the interrogators receives reflected light, and the other of the interrogators receives transmitted light. Moreover, each of the interrogators may alternate between receiving reflected light and receiving transmitted light. Accordingly, in the event that the optical fiber is damaged or cut, reflected light may continue to be received at one of the interrogators. Furthermore, the optical fiber 130 may comprise optical sensors 140 that operate at different frequencies. Should one of the optical sensors fail, another of the optical sensors may then continue to function. Therefore, the present application provides a simple way to obtain the redundancy necessary for safety critical applications.

While some embodiments of the present invention have been described in the context of use within an aircraft, it should be appreciated that the invention has utility in other applications, including in vehicles other than aircraft, such as spacecraft, automobiles, railway vehicles, and watercraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise

The invention claimed is:

1. An optical sensing system comprising:
    an optical fiber comprising one or more optical sensors;
    a light source placed at a first end of the optical fiber, wherein the light source is configured to direct light towards the one or more optical sensors;
    a first interrogator placed at the first end of the optical fiber;
    a second interrogator placed at a second end of the optical fiber, opposite to the first end, and
    a comparing unit;
    wherein the first interrogator is configured to receive light reflected from the one or more optical sensors, and the second interrogator is configured to receive light transmitted from the one or more optical sensors,
    wherein the first interrogator is configured to analyze the light reflected from the one or more optical sensors to determine changes in strain or temperature along the optical fiber,
    wherein the second interrogator is configured to analyze the light transmitted from the one or more optical sensors to determine changes in strain or temperature along the optical fiber, and
    wherein the comparing unit is configured to compare the change in strain or temperature determined by the first interrogator with the change in strain or temperature determined by the second interrogator.

2. The optical sensing system according to claim 1, wherein the one or more optical sensors are configured to sense changes in strain or temperature along the optical fiber.

3. The optical sensing system according to claim 1, wherein the light source is a first light source, and the optical sensing system further comprises a second light source placed at the second end of the optical fiber, and the second light source is configured to direct light towards the one or more optical sensors during a failure of the first light source.

4. The optical sensing system according to claim 1, wherein the one or more optical sensors are fiber Bragg grating sensors.

5. The optical sensing system according to claim 1, wherein the one or more optical sensors include a first optical sensor configured to operate in a first frequency range and a second optical sensor configured to operate in a second frequency range that does not overlap the first frequency range.

6. The optical sensing system according to claim 1, wherein the first interrogator and the second interrogator each have the same structure, and the first interrogator is configured to operate in a first operational mode and the second interrogator is configured to operate in a second operational mode, different than the first operational mode.

7. The optical sensing system according to claim 1, wherein the optical fiber is embedded or attached to a safety critical system of an aircraft.

8. A method for sensing a strain or temperature, the method comprising:
    directing light towards one or more optical sensors in an optical fiber;
    receiving transmitted light from the one or more optical sensors at a first interrogator at a first end of the optical fiber;
    receiving reflected light from the one or more optical sensors at a second interrogator at a second end of the optical fiber;
    analyzing the transmitted light received from the one or more optical sensors by the first interrogator to determine a first change in strain or temperature along the optical fiber,
    analyzing the reflected light received from the one or more optical sensors by the second interrogator to determine a second change in strain or temperature along the optical fiber, and
    comparing the first change to the second change.

9. The method according to claim 8, wherein the one or more optical sensors are configured to sense changes in strain or temperature along the optical fiber.

10. The method according to claim 8, further comprising:
    providing a first light source at the first end of the optical fiber and a second light source at the second end of the optical fiber,
    wherein the step of directing light towards the one or more optical sensors is performed by the first light source and not by the second light source while the first light source is emitting the light, and
    wherein the step of directing light towards the one or more optical sensors is performed by the second light source and not by the first light source during a failure of the first light source.

11. The method according to claim 8, further comprising:
providing a first light source at the first end of the optical fiber and a second light source at the second end of the optical fiber,
wherein the step of directing light towards one or more optical sensors is performed using at least one of the first light source and the second light source.

12. The method according to claim 8, wherein the one or more optical sensors include a fiber Bragg grating sensor.

13. The method according to claim 8, wherein the one or more optical sensors include a first optical sensor configured to operate in a first frequency range and a second optical sensor configured to operate in a second frequency range that does not overlap the first frequency range.

14. The method according to claim 8, wherein the first interrogator and the second interrogator each have the same structure, and the first interrogator is configured to operate in a first operational mode and the second interrogator is configured to operate in a second operational mode different than the first operational mode.

15. The method according to claim 8, wherein the optical fiber is embedded or attached to a safety critical system of an aircraft.

16. An aircraft comprising an optical sensing system, wherein the optical sensing system comprises:
an optical fiber comprising an optical sensor;
a light source at a first end of the optical fiber and configured to direct light along the optical fiber towards the optical sensor;
a first interrogator at the first end of the optical fiber;
a second interrogator at a second end of the optical fiber, wherein the second end is opposite to the first end, and
a comparing unit,
wherein the first interrogator is configured to receive light reflected by the optical sensor, and the second interrogator is configured to receive light transmitted through the optical sensor,
wherein the first interrogator and the second interrogator are configured to analyze the light received from the one or more optical sensors to determine changes in strain or temperature along the optical fiber, and
wherein the comparing unit is configured to compare the change in strain or temperature determined by the first interrogator with the change in strain or temperature determined by the second interrogator.

* * * * *